(12) United States Patent
Hottinen (10) Patent No.: US 7,664,061 B2
(45) Date of Patent: Feb. 16, 2010

(54) CLOSED-LOOP SIGNALING METHOD FOR CONTROLLING MULTIPLE TRANSMIT BEAMS AND CORRESPONDINGLY ADAPTED TRANSCEIVER DEVICE

(75) Inventor: Ari Hottinen, Espoo (FI)

(73) Assignee: Nokia Corporation, Espoo (FI)

( * ) Notice: Subject to any disclaimer, the term of this patent is extended or adjusted under 35 U.S.C. 154(b) by 476 days.

(21) Appl. No.: 10/433,669

(22) PCT Filed: Sep. 5, 2001

(86) PCT No.: PCT/EP01/10229

§ 371 (c)(1),
(2), (4) Date: Jun. 5, 2003

(87) PCT Pub. No.: WO03/023995

PCT Pub. Date: Mar. 20, 2003

(65) Prior Publication Data

US 2004/0042427 A1 Mar. 4, 2004

(51) Int. Cl.
*H04B 7/00* (2006.01)
*H04B 7/02* (2006.01)
*H04L 1/02* (2006.01)
*H04M 1/00* (2006.01)
(52) U.S. Cl. ............ 370/310; 375/267; 455/562.1
(58) Field of Classification Search ........... 455/562.1, 455/69, 101; 375/267; 370/310
See application file for complete search history.

(56) References Cited

U.S. PATENT DOCUMENTS 4,450,582 A * 5/1984 Russell ............ 455/12.1
5,581,654 A * 12/1996 Tsutsui ............ 704/200.1
5,677,998 A * 10/1997 Buckley ............ 706/20

(Continued)

FOREIGN PATENT DOCUMENTS

EP          1054519          11/2000

(Continued)

OTHER PUBLICATIONS

Siemens, "Description of the eigenbeamformer concept (update) and performance evaluation", Feb. 27-Mar. 2, 2001, 3GPP TSG RAN WG 1, pp. 1-9.*

(Continued)

*Primary Examiner*—Lester Kincaid
*Assistant Examiner*—Nathan Mitchell
(74) *Attorney, Agent, or Firm*—Squire, Sanders & Dempsey L.L.P.

(57) ABSTRACT

The present invention relates to a closed-loop signaling method for controlling multiple transmit beams, comprising the steps of receiving (S21) a plurality of at least two beams from a first transceiver (Node_B) via a plurality of transmission channels at a second transceiver (UE), evaluating (S22), at said second transceiver, characteristics of said plurality of beams received at said second transceiver, determining at least one dominant beam using said characteristic, deriving (S24) control information for being fed back from said second transceiver (UE) to said first transceiver (Node_B), based on said evaluated characteristics, wherein said control information for dominant characteristics is allocated a different quantization resolution as compared to a less dominant beam (S25, S26, S27). Also, the present invention relates to a transceiver device (UE), adapted for being used in such a closed-loop signaling method for controlling multiple transmit beams.

32 Claims, 3 Drawing Sheets closed-loop diversity in downlink

U.S. PATENT DOCUMENTS 6,389,066 B1 * 5/2002 Ejzak .................. 375/224

FOREIGN PATENT DOCUMENTS

WO            00/72465          11/2000

OTHER PUBLICATIONS

Harry Newton, Newton's Telecom Dictionary, Oct. 1998, Telecom Books, 14th Edition, pp. 615-616.*

Bernard Sklar. Digital Communications 2nd edition. Prentice Hall, Inc. Jan. 2001. p. 80.*

"Advanced Closed Loop Tx Diversity Content (eigenbeamformer)," 3GPP TSG RAN WG 1, XX, XX, Jul. 4, 2000, XP002169992.

ETSI SMG2 UMTS, Physical Layer Expert Group, Meeting No. 3, Bocholt, Germany, May 18-20, 1998.

ETSI SMG2 UMTS LI Expert Group, Turin, Jun. 15-17, 1998.

S.M. Alamouti, "A simple transmitter diversity scheme for wireless communications,", V. 16, No. 8, Oct. 1998, pp. 1451-1458.

A. Hottinen and R. Wichman, Transmit diversity by antenna selection in CDMA downlink, Proc. IEEE Int. Symp. Spr. Spect. Tech. Appl. (ISSSTA), Sun City, South Africa, Sep. 1998.

A Hottinen, R. Wichman and D. Rajan, Soft-weighted transmit diversity for WCDMA, Proc. Alelrton Conf. Comm. Illinois, USA, Sep. 1999.

A. Narula, M. Trott and G. Wornell, Information-theoretic analysis of multipleantenna transmission diversity, in Proc. Int. Symp. Inf. Th. Appl., Canada, Sept. 1996.

H. Olofsson, M. Almgren and M. Hook, Transmitter diversity with antenna hopping for wireless communication systems, in Proc. IEEE Vehic. Tech., Phoenix, Arizona, May 1997.

D. Gerlach and A. Paulraj, Adaptive Transmitting antenna arrays with feedback, IEEE Signal Processing Letters, 1: 150-152, Oct. 1994.

A.J. Paulraj and C. B. Papadias, Space-Time Processing for wireless communications, IEEE Signal Processing Magazine, pp. 49-83, Nov. 1997.

G. Raleigh and J. M. Cioffi, Spatio-temporal coding for wireless communication, IEEE Trans. Comm., vol. 46, No. 3, Mar. 1998.

3GPP RAN WG1, Phsical Layer-General Description, v. 2.0.0, Apr. 1999.

Y. Le Pezzennec, F. Boixadera, Y. Farmine, and N. Whinnett, A transmit adaptive antenna scheme with feedback mechanism for wireless communication systems, in Proc. Allerton Conf. Comm., Illinois, USA, Sep. 1999.

Samsung Electronics, Proposal for Downlink Time Switchen Transmission Diversity, Contribution to ETSI SMG2 L1, Bocholt, Germany, May 18-20, 1998.

Nokia. Proposal to simplify the Tx diversity closed loop modes. TSG-R WG1 document, TSGR16(99)945, Jul. 13-16, 1999, Espoo, Finland, 18pp.

A. Dabak, S. Hosur, S. and R. Negi, Space time block coded transmit antenna diversity scheme for WCDMA, pp. 1466-1469, in Proc. Wirel. Commun. Netw. Conf. (WCNC), New Orleans, USA 1999.

Siemens, "Advanced closed-loop Tx diversity concept (eigenbeamformer),"TSG-R WG1 document, TSGR1#14(00)0853, Oulu, Finland, Jul. 2000.

Nokia. Recommended simulation parameters for Tx diversity simulations. TSG-R WG1 document, TSGR1#14(00)0867, Jul. 4-7, 2000, Oulu, Finland, 5pp.

W. Utschnik and C. Brunner, Efficient tracking and Feedback of DL-eigenbeams in WCDMA in Proc. 4$^{th}$ European Personal Mobile Communications Conference, Vienna, Austria, Feb. 2000.

F.R. Ffarrokhi, G.J. Foschini, A. Lozano, R.A. Valenzula: Link-Optimal BLAST Processing with Multipe-Access Interference IEEE 2000.

* cited by examiner

The loss in received signal power at UE, when using ICA-based long-term beam calculation (two upper graphs), and eigenbeams (two bottom graphs). Dashed line represents asymmetric quantization, for the two sets.

FIG. 3

CLOSED-LOOP SIGNALING METHOD FOR CONTROLLING MULTIPLE TRANSMIT BEAMS AND CORRESPONDINGLY ADAPTED TRANSCEIVER DEVICE

FIELD OF THE INVENTION

The present invention relates to a closed-loop signaling method for controlling multiple transmit beams and a correspondingly adapted transceiver device.

BACKGROUND OF THE INVENTION

Diversity is used in communication systems such as wireless communication systems in order to enhance communication quality by transmitting information to be transmitted via various (space and/or time varying) channels. Diversity arrangements can be categorized as open-loop diversity and closed-loop diversity concepts. Closed loop diversity concepts apply a feedback of information from the receiver having received a diversity transmission to the transmitter to thereby perform a feedback control of the diversity transmission.

The closed-loop techniques adopted in 3GPP ($3^{rd}$ Generation Partnership Project) typically attempt to approximate the beamforming with perfect or average (spatial) channel state information in the transmitter. Then, one obtains array gains as the signal transmitted by the different antenna elements (forming an array) can be combined coherently. Naturally, conveying the channel state information with sufficient reliability and transmission rate can require a signaling channel of relative high capacity from the user equipment (UE) to the network and/or to the base station(s).

Note that the user equipment UE according to 3GPP and/or UMTS (Universal Mobile Telecommunication Standard) corresponds to a mobile station according to GSM (Global Standard of Mobile Communication). The present invention as described herein below is, however, not limited to be applied to a specific communication standard. References to UMTS 3GPP standard currently being developed serve as a mere example only and are not limiting the scope of the invention.

Figure 1:
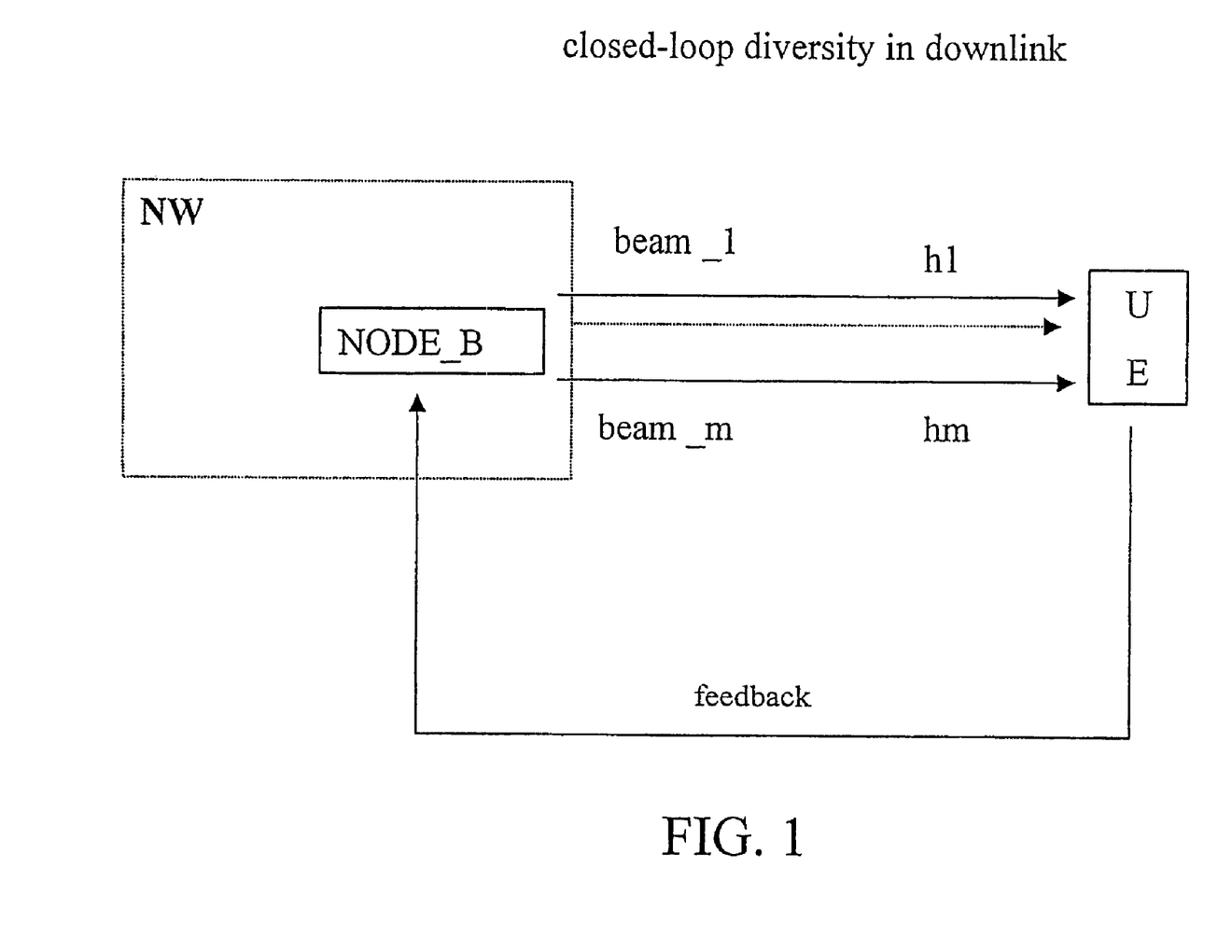
FIG. 1 shows a general closed-loop diversity arrangement, to which the present invention may advantageously be applied.

FIG. 1 shows in rough outline the feedback control arrangement for closed-loop diversity concepts. A communication network NW (e.g. UMTS or GSM or any other network) is represented by one of a plurality of Node_B (UMTS) (corresponding to a base station BS in GSM). The Node_B is provided with an array of antennas (not shown) from which a corresponding plurality of beams emerges in direction of the user equipment UE. Each beam in downlink direction travels and/or propagates via a transmission channel that can be represented by its channel transfer function h. The array of antennas thus leads to a matrix of channel transfer functions H representing the transmission behavior of the Node_B. For the purpose of the present invention, a Node_B and/or base station represents a first transceiver, while a user equipment UE and/or mobile station represents a second transceiver. However, the invention is not restricted to this but can be applied for any similar multi-antenna transmitter-receiver concept.

Upon receiving a plurality of at least two beams from the first transceiver via the plurality of transmission channels at the second transceiver, the second transceiver performs a well known processing to e.g. obtain the channel transfer functions (estimates), and derives control information for being fed back from said second transceiver UE to said first transceiver Node_B in order to accomplish a feedback control. Note that the channel transfer function estimates may, for example, be obtained using Viterbi detection and/or processing of pilot signals containing known training sequences, or by any other suitable known method.

W. Utschnik et al presented in the Proc. $4^{th}$ European Personal Mobile Communications Conference, Vienna, Austria, February 2000, a contribution entitled "Efficient tracking and feedback of DL-Eigenbeams in WCDMA" by means of which a distributed implementation of the eigenspace/-beam tracking at the user equipment and the base station, respectively, was proposed with a corresponding feedback signaling. Since the adopted feedback signaling is fixed, it inevitably involves some overhead being transmitted back and at least occupies feedback signaling capacity which could be used otherwise more efficiently.

In the 3GPP TSG RAN WG 1 Meeting #14, Jul. 4-7, 200, Oulu, Finland, Siemens submitted a proposal for an "Advanced closed loop Tx diversity concept (eigenbeamformer)" for discussion. The required feedback signaling used in the thus proposed arrangement is still considerable and thus also at least occupies feedback signaling capacity which could be used otherwise more efficiently.

SUMMARY OF THE INVENTION

Therefore, it is an object of the present invention to provide a closed-loop signaling method for controlling multiple transmit beams, such as a closed-loop transmit diversity or a closed-loop multi-input multi-output (MIMO) signaling method, which is free from the above mentioned drawback and thus optimized in terms of its feedback signaling in order to minimize the overhead due to said signaling.

According to the present invention, this object is for example achieved by a closed-loop signaling method for controlling multiple transmit beams, comprising the steps of receiving a plurality of at least two beams from a first transceiver via a plurality of transmission channels at a second transceiver, evaluating, at said second transceiver, characteristics of said plurality of beams received at said second transceiver, determining at least one dominant beam using said characteristic, deriving control information for being fed back from said second transceiver to said first transceiver, based on said evaluated characteristics, wherein said control information for dominant characteristics is allocated a different quantization resolution as compared to a less dominant beam.

Still further, according to the present invention, this object is for example also achieved by a transceiver device, adapted for being used in a closed-loop signaling method for controlling multiple transmit beams, said transceiver device comprising reception means adapted to receive a plurality of at least two beams from another transceiver via a plurality of transmission channels, evaluation means adapted to evaluate, characteristics of said plurality of beams, determination means adapted to determine at least one dominant beam using said characteristic, derivation means adapted to derive control information for being fed back from said transceiver (UE) to said first transceiver, based on said evaluated characteristics, wherein said control information for dominant characteristics is allocated a different quantization resolution as compared to a less dominant beam.

It is to be noted that a beam may correspond to a spatial channel and determining the parameters for at least two beams may be effected for beams which are possibly different from the ones from which the channel estimates were obtained from.

According to advantageous further developments of the present invention, i.e. of the method as well as of the transceiver device, said quantization resolution allocated to said dominant beam is higher as compared to the one of a less dominant beam;

said plurality of beams constitutes a parameterized beam array, and said characteristics of said beams is represented by parameterization parameters;

said characteristics is based on a matrix decomposition of the channel realizations, channel matrix, or a correlation matrix being based on the channel matrix or channel realizations of the channel impulse responses of the plurality of channels, for example, is based on an eigenvalue decomposition, while other decompositions are also possible, e.g. singular value decomposition or generalized singular value decomposition, independent component analysis etc;

the beams that have the highest effect on the received signal power represent the dominant beams the paramaterization parameter having the maximum value is determined as representing the dominant beam;

said characteristics are based on an eigenvalue or matrix decomposition of the long-term averaged correlation matrix or short-term correlation matrix being based on plural instantaneous channel matrices of the channel impulse responses of the plurality of channels;

the eigenbeam having the maximum eigenvalue is determined as representing the dominant beam;

said characteristics is based on an independent component analysis of said channel realizations or channel matrix, or channel correlation matrix yielding a relative power indication per beam;

said characteristics are estimated adaptively from received signals (without explicitly estimating channel correlation matrix or subsequent matrix decomposition, but rather adaptively estimating the desired characteristics (desired beams, e.g. the eigenvectors) from channel realizations, or channel estimates)

the beam corresponding to the relative power indicator indicating the largest relative power, is determined as representing the dominant beam;

said control information for said beam determined as being dominant is allocated a predetermined quantization resolution (it is to be noted that in the predetermined quantization resolution the parameters of the dominant beams may be quantized with higher resolution, with more quantization bits, than a beam that is not equally dominant, the number of bits can be predetermined as well);

said second transceiver determines the quantization resolution to be allocated to said beam determined as being dominant;

said control information for said beam or beams determined as being dominant is allocated a 8-PSK quantization resolution constellation, and QPSK or BPSK quantization resolution constellation is allocated to the control information for the remaining less dominant beams;

said control information for said beam determined as being dominant is allocated a 8-PSK or QPSK quantization resolution constellation, and QPSK or BPSK, or BPSK quantization resolution constellation is respectively allocated to the control information for the remaining less dominant beams.

Thus, by virtue of the present invention being implemented, the following advantages can be achieved:

the feedback signaling is optimized in terms of minimizing the overhead due to said signaling;

gains in channels (uncorrelated or correlated channels) can be achieved when compared to signaling with the same quantization resolution for each beam;

less feedback signaling is required;

memory requirements and calculation requirements at the user equipment can thus be reduced;

enables a tradeoff between the use of coded feedback information for beam representation, and beam representation accuracy (i.e. in general fewer bits for representing the beams can be used, and if needed, they can be utilized to add coding to make the signaling robust against feedback errors)

signaling overhead can be reduced (for less dominant (eigen)beams, since less signaling capacity (lower resolution) is used for these, whereas the accuracy of the result fed back for closed-loop control purposes can be increased due to the use of a higher resolution for more dominant beams, thereby providing an improvement of the previously known concept(s).

Thus, as stated above, but expressed in other words, the concept as proposed by the present invention resides in allocating fewer bits to represent less dominant feedback beams than to more dominant ones. Namely, since feedback signaling capacity as such is often fixed and therefore limited, according to the present invention (long-term) feedback coefficients are progressively, i.e. differently quantized according to their dominance. Thereby, better gain out of relevant/dominant downlink diversity beams can be obtained. The quantization resolution may thus depend, for example, on the magnitude of the eigenvalues, measured at the user equipment (using e.g. common or dedicated pilot channels). This invention thus proposes a particular quantization concept in which the beams (signaled from UE to Node_B) which have a smaller effect on the capacity or on the Signal-to-Noise Ratio SNR gain of a given user is allocated fewer bits, and those beams that have a significant effect are allocated more bits.

BRIEF DESCRIPTION OF THE DRAWINGS

The present invention will be more readily understood when read in conjunction with the accompanying drawings, in which.

DETAILED DESCRIPTION OF THE EMBODIMENTS

The present invention will subsequently be described in detail with reference to the drawings.

It is to be noted that the present invention may advantageously be applied to the feed-back structure shown in FIG. 1 and already described in detail herein above, so that a repeated description thereof is considered to be dispensable. It is further to be noted that a beam means a spatial transmission channel. Each antenna element may emit one beam, while it is also possible that depending on the antenna characteristic one antenna element may emit plural beams. For simplicity, however, the subsequent description will assume that one beam per antenna element is being emitted.

Figure 2:
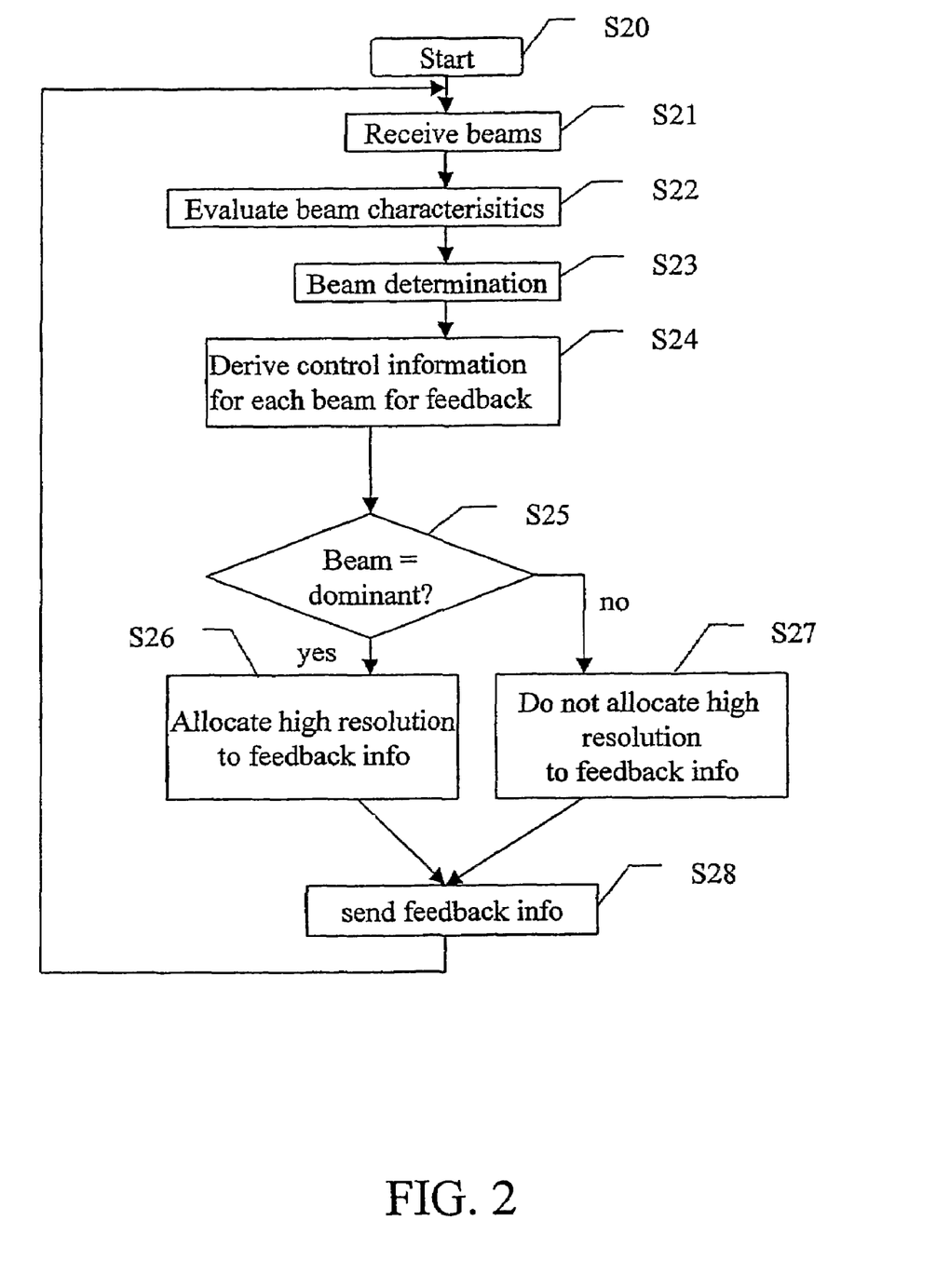
FIG. 2 shows a flowchart of the method steps according to the present invention, when implemented in the user equipment.

FIG. 2 shows a flowchart of the method steps according to the present invention, when implemented in the user equipment. Note that the processing need not be restricted to be implemented solely at the user equipment. In terms of minimizing a required signaling between network components, however, the implementation at the user equipment is advantageous.

The procedure starts in step S20. Thereafter, in step S21, the user equipment as a second transceiver UE receives a plurality of at least two beams from a first transceiver, i.e. the Node_B via a plurality of transmission channels h1, ..., hm. (Each beam travels via a slightly different transmission channel and is thus subjected to a respective different channel transfer function.) In step S22, an evaluation of the respective beam characteristics is performed, followed in step S23 by determining the desired beams and classifying said desired beams according to a comparison of said evaluated characteristics such that at least one of said desired beams is judged to represent a dominant beam. This means that for example the beam characteristics are mutually compared to each other to find the most dominant, "best" one. Alternatively, the characteristics could be compared to a threshold value, and only those found to be above said threshold would be compared further with each other to find the most dominant beam.

In a subsequent step S24, control information to be fed back from said user equipment to said Node_B is derived for each beam. The control information is based on and/or corresponds to the evaluated characteristics. However, since the deriving of the control information as such is not a primary concern of the invention as proposed, this is not explained here in greater detail.

If in step S25 a respective beam is judged to be the most dominant beam (YES in S25), the flow proceeds to step S26, where this dominant beam is allocated a high resolution for the corresponding feedback information of said beam. If, in contrast thereto, step S25 yields that the beam is not dominant, no high resolution (a lower resolution than the high resolution) is allocated to the feedback information for the representation of the respective less dominant beam (S26).

Note that the high resolution may be predetermined or may be determined by e.g. the user equipment. The resolutions may be QAM (Quadrature Amplitude Modulation), PAM-PSK (PAM=Pulse Amplitude Modulation), 8-PSK, QPSK, and/or BPSK, as an example. Hence, the dominant beam may be allocated 8-PSK resolution and the remaining beams QPSK and/or BPSK resolution. It is possible that the dominant beam is allocated the highest resolution and that all other beams are allocated a common lower resolution. Nevertheless, it is also possible that the less dominant beams are allocated or represented with different resolutions, e.g. that the less dominant beams are split into two classes of less dominant beams, one class (e.g. the most dominant one of the less dominant beams) being allocated QPSK resolution, the others being allocated BPSK (assuming 8-PSK being allocated to the most dominant beam). Various modifications are possible to such a progressive resolution allocation, e.g. the less dominant beams may be subjected to the same processing as initially, so that among the less dominant beams the relatively most dominant beam is determined and/or classified. Hence, according to such a scheme, the dominance of the beams is progressively determined.

Once the resolution has been allocated in steps S26 and S27, the feedback information is sent in step S28 from the user equipment to the Node_B, and the flow returns to step S21, where the beams controlled/modified using the feedback information are then received, etc.

The characteristics can be calculated using channels estimates using beams with fixed coefficients (e.g. from M channels, each transmitted with a fixed coefficient from different antenna elements, in 3GPP CPICH channels are transmitted). Alternatively, the characteristics can be differential to the previously quantized and signaled desired beams.

The present invention will subsequently be described with reference to some specific cases.

1. Transmit Diversity/MIMO with Long-term Beams

In correlated channels the required feedback capacity can be often reduced. Two approaches are discussed in the following.

The first approach discusses a particular array parameterization and the second is based on dimension reduction trough eigenvalue decomposition.

1.1. Array Parametrization

In the following example we address a parameterized beam-forming concept in which the transmit weight/array vector (i.e. feedback weight signal), parameterized by $\theta_q$, is given by $$w(\theta_q) = [1, e^{j2\pi d \sin(\theta_q)/\lambda_l}, \ldots, e^{j2\pi(M-1)d\sin(\theta_q)/\lambda_l}]^T / \sqrt{M} \quad (1)$$

where d is the spacing between M antenna elements and $\lambda_l$ the carrier wavelength. (Subscript "$T$" denotes the transposed vector/matrix.) The element spacing d can be in principle arbitrary. However, when the transmitting elements are calibrated, and separated by distance $d=\lambda_l/2$ from each other, the feedback can be defined so that it determines a transmit direction such that the received signal power is maximized. However, even if the transmitting elements are not calibrated or the elements are at arbitrary locations such that the channels are not fully correlated, this approach nevertheless finds the array vector which best matches with the (instantaneous) downlink channel.

We assume that the channel coefficients between each transmit antenna element and the receive antennas are estimated using pilot channels (either dedicated or common pilots can be used). The terminal constructs the channel matrix $H=(h_1, \ldots, h_m)$, where $h_m$ is the channel impulse response between the m-th array element and the terminal with desired discretization. The feedback weight w can be calculated from the eigenvector corresponding to the largest eigenvalue of the channel matrix $R=H^H H$, like in the 3GPP specification. (The subscript "$H$" denotes the conjugate complex transposed matrix/vector.) More precisely, the terminal calculates the eigenvalue decomposition of the correlation matrix $$RE = \Lambda_L E$$

in which the columns of $E=[e_1, \ldots, e_m]$ are the eigenvectors corresponding to eigenvalues $\lambda_{l_1}, \ldots, \lambda_{l_m}$ arranged in decreasing order in magnitude. (Note that $\Lambda_L = \text{diag}[\lambda_{l_1}, \ldots, \lambda_{l_m}]$, "diag" denoting the diagonal matrix having matrix elements differing from zero only in its diagonal.) It is well known that the eigenvector $e_1$ maximizes the signal power at the receiver. However, rather than to signal the unstructured eigenvector(s) $\{e_m\}$ and possibly the related eigenvalue(s) to the base station/Node_B, the terminal/user equipment can send only the relevant parameter(s) when controlling the array. In the case described above the relevant parameter is $\Theta_Q^*$, which can be calculated from $$\Theta_Q^* = \arg\max_{\Theta_Q} \|w(\Theta_Q)^H e_1\|^2 \qquad (2)$$

with desired quantization resolution (to be addressed in the following section). If diversity beams, or multiple parallel beams are needed these can be generated by signaling the respective parameter(s) corresponding to $e_2$, and so on. In this particular parameterization the same relative phase, calculated e.g. using common channel measurements, is used between the neighboring transmitting elements. The current feedback Mode 2 can support eight transmit directions, e.g. when the phase of the feedback word is used to represent the transmit direction, even if the gain bit in the feedback word is neglected. It is clear that the proposed parameterization reduces the required number of feedback bits, and it holds Mode 2 of the standardized two antenna concept as a special case (when there are only two transmitting elements). With this concept the terminal can control the transmit direction so that the instantaneous signal power is maximized.

1.2. Long-Term Beams

Long-term properties of the downlink channel can be used also to reduce the required feedback. This approaches assumes that some beams are on average more "beneficial" than others.

To describe the approach (without restricting the implementation) we assume that the terminal maintains an estimate of the averaged correlation matrix $$R[t_0] = C \sum_{t=t_0-P}^{t_0} H^H[t] H[t]$$

where H[t] constitutes the instantaneous channel matrix at time slot t and C is a normalization coefficient. The integration window P (over which the averaging is conducted) should extend well over the channel coherence time. In structured or correlated channels this matrix has a small number of dominant eigenvalues. In this case the dominant long-term beams are defined (at slot $t_0$) as the dominant eigenvectors of $R[t_0]$ using the eigenvalue decomposition $$R[t_0]E = \Lambda_L E$$

The dominant eigenvectors (or their parameters) are signaled to the base station/Node_B in feedback signaling. The base station transmits then to the user equipment UE these dominant long-term beams, e.g. using any desired open-loop transmit diversity concept. Note that short-term feedback is determined in the above concept when P is within the channel coherence time.

In order to further boost the performance, the base station can request fast feedback that is conditioned on the long-term beams The last feedback is based on the effective channels $$h_{ej}[t] = H[t]e_j, j=1,\ldots,L \qquad (4)$$

where L long-term beams are used. When L=2 these two effective channels be used in place of $h_1$ and $h_2$ when calculating short-term feedback information using eq. (1). Selecting the strongest beam on a slot-by-slot basis as proposed by Utschick et al (mentioned before) is one possibility. However, when considering the terminal channel estimation issues one could apply soft-weighted STTD (space-time transmit diversity) to further boost the performance. With soft-weighted STTD antenna/beam verification can be neglected. More generally, short-term feedback algorithms that are based on eq. (1), adopted in Mode 1 or Mode 2, can be used. Preliminary simulations were carried out in a two path Rayleigh fading channel, with four transmit antennas and with a specific spatial correlation matrix. The simulations show that the relative gain when applying eq. (1), when compared to beam selection, is more than 1 dB. Of course the gain depends on the structure of the downlink channel e.g. the eigenvalue spread.

Similar concepts have been proposed independently in by Utschnik et al and by Siemens (both mentioned above). Furthermore there was proposed a related subspace beamforming approach in which the spatial correlation matrices are signaled to the base station and used to mitigate interference between the downlink users.

2. Proposed Quantization Concept

Siemens proposed the so called eigenbeamformer concept without specifying how the long-term beams are quantized optimally. There it is only stated that one can have a certain number of bits to quantize the gain and the phase of each element of each eigenbeam. Furthermore, it seems to be assumed that whatever the quantization method is, the same method is used for all eigenbeams.

The method proposed in this invention (applicable to both concepts as outlined above in section 1.1. and 1.2.) fixes a general approach for quantizing the transmit beams. The invention is not restricted to the use of eigenbeams, and the same approach can be used also with parameterized beams or for any other method of calculating long/short-term beams at the terminal (as long as they are signaled to the BS/Node_B).

In the context of long/short-term (eigen) beams the proposed method suggests simply a concept in which the (eigen) beam with the largest eigenvalue has a higher resolution feedback (with more feedback bits) than the beams with smaller eigenvalues. Thus, the dominance in this context corresponds for example to the relative magnitude of the eigenvalue. Alternatively, it can be determined by evaluating the effective (relative) received power $$\|H^H e_j\|^2$$

or $$\|H^H w(\Theta_Q)_j\|^2$$

for each parallel beam with a given quantization for the beam parameters.

As an example, we can quantize each element of the dominant eigenvector to 8-PSK constellation and the elements of the remaining eigenvectors to QPSK (quadrature phase shift keying) or BPSK (binary phase shift keying), as their effect on capacity is less pronounced. In this case the dominant beam is parameterized by $$w(\Theta_q) = [1, e^{j2\pi th1/360}, \ldots, e^{j2\pi thm/360}]^T / \sqrt{M}$$

where th1, ..., thm have 8 possible phases (e.g. 0°, 45°, 90°, ..., 315°), whereas in other beams the possible phases have only 4 possible values, e.g. (0°, 90°, 180°, 270°). The first component is assumed, without loss of generality, to have phase 0.

The bit allocation can thus depend on the eigenvalues or the effective received powers for given parameterized beams. It is clear the gain can be quantized also differently for dominant and non-dominant beams, although this is omitted above for clarity.

One can use other techniques apart from eigenvalue decomposition to calculate the dominant long-term beams. For example, one can use independent component analysis ICA either directly to channel matrix or to the average downlink correlation matrix. In this case one obtains typically a set of non-orthogonal long-term beams that can have different relative powers. In this case one can again allocate fewer bits to the long-term beams with smaller power. Thus, the power corresponds in this context to the dominance. Thus, in connection with the present invention, it does not matter how the dominant beams are determined, i.e. how the beam characteristics are evaluated, whether by calculation (adaptively or by using some matrix decomposition) or in other manners, but once the dominant beams are detected/determined, the feedback information related thereto are represented with higher resolution.

3. Comparative Example

Consider the following simple example. We apply the channel model proposed by Siemens using a correlation matrix estimated at UE.

Figure 3:
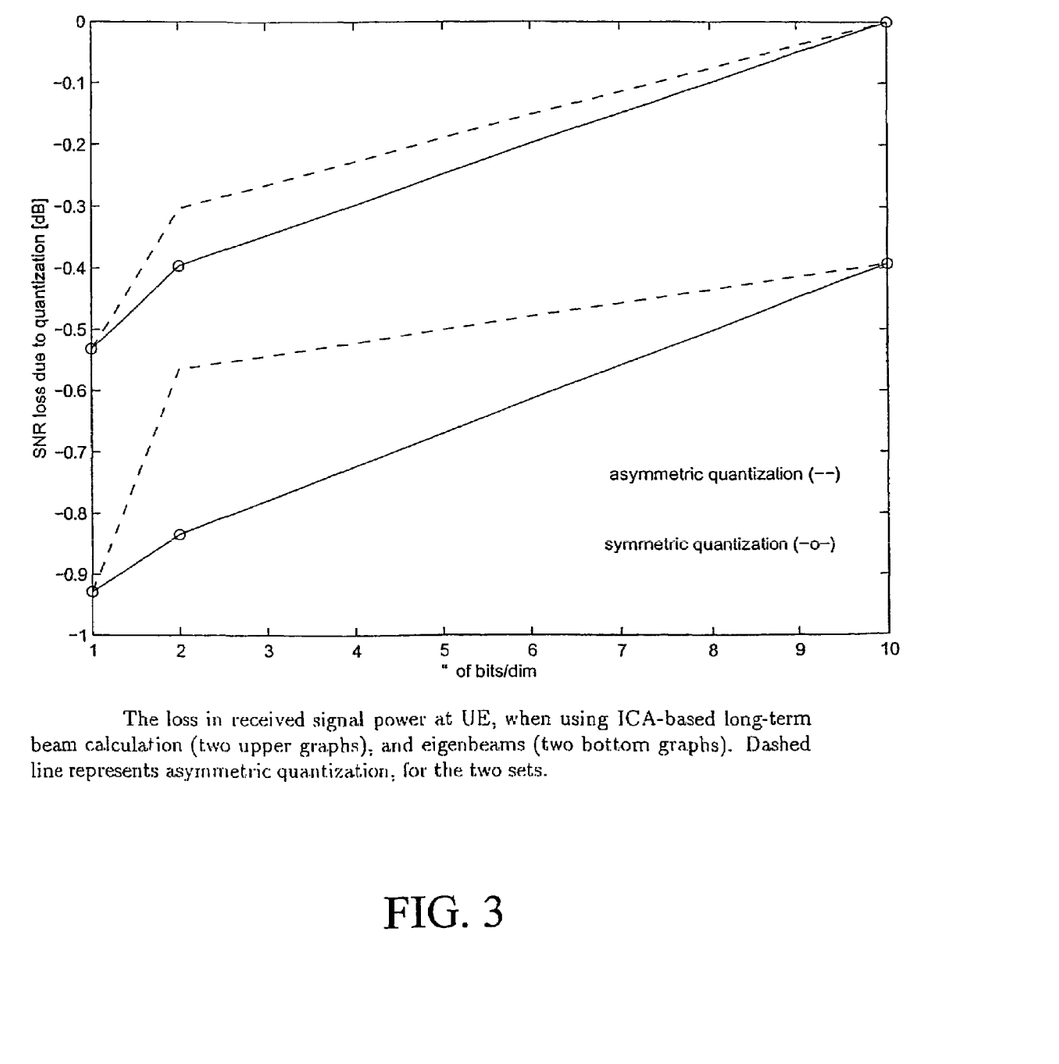
FIG. 3 illustrates the SNR loss due to quantization for examples of asymmetric and symmetric quantization.

The following quantization is considered. Real and imaginary parts of each element of the long-term beams are quantized in a symmetric case with 1, 2 or 10 bits. The case with 10 bits essentially approximated the unquantized feedback case, and serves as an upper bound. When 1 bit is used, we allocate $(M-1)*2$ bits per eigenvector and each element is a QPSK symbol. When 2 bits are used (see the label in FIG. 3) the real and imaginary parts are quantized with 2 bits and there are 16 states in the corresponding (eigen)beam element. Uniform quantization to a grid in complex space, is considered only for simplicity, without in any way restricting quantization concept in general.

Asymmetric quantization as proposed in connection with the present invention refers to the case where the more dominant beams have more quantization bits. In the considered example uniform quantization is used in which the elements of the dominant beams are quantized with 3 bits per dimension and the elements of the second largest or less effective beam is quantized with only 1 bit per dimension. Hence at label 2 in FIG. 3 the same number of feedback bits are transmitted to the base station, the number being $$(M-1)*2*3[\text{dominant beam}]+(M-1)*2*1[\text{second-beam}].$$

When M=4, we send therefore 24 bits to represent the eigenbeams. The quantized eigenbeams are again (ortho)normalized at the base station, and short-term feedback is used in the example to combine the beams coherently using eq. 4. It is seen from FIG. 3 that (i) non-orthogonal ICA-based long-term beam calculation is better than the eigenbeams proposed by Siemens, and (ii) asymmetric quantization outperforms symmetric quantization. For ICA, the two dominant beams are almost equally powerful and therefore the effect of asymmetric quantization is not as significant.

4. Conclusion

A simple approach for quantizing the long-term beams is presented. This method can be adopted in both, MIMO (multiple input multiple output) concepts where the parallel beams are used to increase the data rate of the transmission, and in TX diversity concepts, where the multiple parallel beams are used to increase only diversity and the method can be implemented in a number of ways.

As an example, rather than having fixed quantization resolution for each beam, the UE can determine the bit allocation and incorporate this knowledge to uplink signaling format (similar to methods used in source coding. In any case, it is seen from the previous example that 2 bits/per dimension on average is sufficient as the loss when compared to 10 bit quantization is not very high, when these bits are allocated asymmetrically to different beams. Furthermore, the method can be used with parametric channels, in which case the dominant parameterized beam is allocated more bits to represent the beam (e.g. higher resolution direction of transmission for dominant beams). The method can be used also with a sequential updating scheme proposed by W. Utschik et al. In that case the dominant beam is updated with higher resolution feedback. In the sequential updating the characteristic features can be calculated e.g. using the difference of the correlation matrix from which the previous beams coefficients were calculated, and the current correlation matrix. Alternatively, it is calculated from the generalized eigenvalue of the said matrix pair.

Thus, as has been described herein above, the present invention relates to a closed-loop signaling method for controlling multiple transmit beams, comprising the steps of receiving S21 a plurality of at least two beams from a first transceiver, Node_B, via a plurality of transmission channels at a second transceiver UE, evaluating S22, at said second transceiver, characteristics of said plurality of beams received at said second transceiver, determining at least one dominant beam using said characteristic, deriving S24 control information for being fed back from said second transceiver UE to said first transceiver, Node_B, based on said evaluated characteristics, wherein said control information for dominant characteristics is allocated a different quantization resolution as compared to a less dominant beam S25, S26, S27. Also, the present invention relates to a transceiver device (UE), adapted for being used in such a closed-loop signaling method for controlling multiple transmit beams.

Note that the user equipment UE calculates the [unquantized or quantized] dedicated beams using downlink channels transmitted from arbitrary common downlink beams, determines the ones that would give the best SNR (dominant), then signals these beam coefficients to the base station, and the base station uses these to modify transmission with respect to the common beam. The UE does classifies the beams derived from common channel measurements. Also, it does not have to be a common channel, but any probing channel. In WCDMA it is likely to be a common channel, however.

Stated in other words, the characteristics are measured using probing beams B1, B2, . . . , Bm (e.g. the channel estimates are obtained by measuring the channel coefficients h1, h2 . . . hm, from all transmit beams to all receive antennas). The characteristic features of these channels are calculated, and the dominant characteristics are determined. The UE determines at least two parameterized m-dimensional weighting vectors based on dominant characteristics, and these are used to linearly combine the signals transmitted from the m (probing) beams. The parameterized m-dimensional weighting vectors that corresponds to the dominant characteristic is represented with a different number of quantization bit than at least one non-dominant weighting vector.

The probing beams can be the same (but need not be) for all users, but the weighting vectors are different for different users.

Additionally, the data can be distributed to the multiple transmit beams using any known coding & modulation method (space-time coding, turbo coding, etc), and the selection may depend on the data rate requirement. The number of information bits transmitted from the dominant beams may be higher than the number of bits (data rate) in the less dominant beams. Also, the transmit power of less dominant beams may be lower than that of the dominant ones.

Still further, it is to be noted that the multiple beams can be used for diversity or MIMO purposes. With diversity, different beams can carry different substreams of (coded) data, different parts of space-time block codes, such that the data rate is the same in corresponding single-antenna transmission, as an example. With MIMO (data rate increase using multiple transmit (and receive) antennas) the data rate is increased with multiple parallel transmission with at least partially different modulation or coding. Different beams can also have a different data rate, depending on channel characteristics.

Although the present invention has been described herein above with reference to its preferred embodiments, it should be understood that numerous modifications may be made thereto without departing from the spirit and scope of the invention. It is intended that all such modifications fall within the scope of the appended claims.

The invention claimed is:

1. A method, comprising:
   receiving a plurality of at least two beams from a first transceiver via a plurality of transmission channels at a second transceiver;
   evaluating, at said second transceiver, characteristics of said plurality of beams received at said second transceiver;
   determining at least one dominant beam using said characteristics; and
   deriving control information for being fed back from said second transceiver to said first transceiver, based on said evaluated characteristics, wherein said control information for at least one dominant beam is allocated a different quantization resolution as compared to a less dominant beam, wherein said quantization resolution allocated to said at least one dominant beam is higher as compared to the one of a less dominant beam.

2. A method according to claim 1, wherein said plurality of beams constitutes a parameterized beam array, and said characteristics of said beams are represented by parameterization parameters.

3. A method according to claim 2, wherein said characteristics are based on an eigenvalue decomposition of the correlation matrix being based on the channel matrix of the channel impulse responses of the plurality of channels.

4. A method according to claim 3, wherein the beams that have the highest effect on the received signal power represent the dominant beams.

5. A method according to claim 3, wherein a parameterization parameter having the maximum value is determined as representing the dominant beam.

6. A method according to claim 1, wherein said characteristics is based on an eigenvalue or matrix decomposition of the long-term averaged correlation matrix or short-term correlation matrix being based on plural instantaneous channel matrices of the channel impulse responses of the plurality of channels.

7. A method according to claim 6, wherein an eigenbeam having a maximum eigenvalue is determined as representing the dominant beam.

8. A method according to claim 1, wherein said characteristics are based on an independent component analysis of said channel realizations, or channel matrix, or channel correlation matrix yielding a relative power indication per beam.

9. A method according to claim 1, wherein said characteristics are estimated adaptively from received signals.

10. A method according to claim 8, wherein the beam corresponding to the relative power indicator indicating the largest relative power, is determined as representing the dominant beam.

11. A method according to claim 1, wherein said control information for said beam determined as being dominant is allocated a predetermined quantization resolution.

12. A method according to claim 1, wherein said second transceiver determines the quantization resolution to be allocated to said beam determined as being dominant.

13. A method according to claim 1, wherein said control information for said beam or beams determined as being dominant is allocated a 8 phase-shifting keying quantization resolution constellation, and quadrature phase-shift keying or binary phase-shifting keying quantization resolution constellation is allocated to the control information for the remaining less dominant beams.

14. A method according to claim 12, wherein said control information for said beam determined as being dominant is allocated a 8 phase-shifting keying or quadrature phase-shifting keying quantization resolution constellation, and quadrature phase-shifting keying or binary phase-shifting keying, or binary phase-shifting keying quantization resolution constellation is respectively allocated to the control information for the remaining less dominant beams.

15. An apparatus, comprising:
   a receiver configured to receive a plurality of at least two transceiver beams from another transceiver via a plurality of transmission channels;
   an evaluator configured to evaluate, characteristics of said plurality of beams;
   a determiner configured to determine at least one dominant beam using said characteristics; and
   a derivation device configured to derive control information for being fed back from said transceiver to said first transceiver, based on said evaluated characteristics, wherein said control information for said at least one dominant beam is allocated a different quantization resolution as compared to a less dominant beam, wherein said quantization resolution allocated to said at least one dominant beam is higher as compared to the one of a less dominant beam.

16. The apparatus according to claim 15, said apparatus configured to perform a closed-loop signaling method configured to control multiple transmit beams, comprising:
   receive a plurality of at least two beams from a first transceiver via a plurality of transmission channels at a second transceiver;
   evaluate, at said second transceiver, characteristics of said plurality of beams received at said second transceiver;
   determine at least one dominant beam using said characteristics; and
   derive control information to be fed back from said second transceiver to said first transceiver, based on said evaluated characteristics, wherein
   said control information for said at least one dominant beam is allocated a different quantization resolution as compared to a less dominant beam, wherein said quantization resolution allocated to said at least one dominant beam is higher as compared to the one of a less dominant beam.

17. An apparatus, comprising:
   a receiver configured to receive a plurality of beams from a first transceiver via a plurality of transmission channels at a second transceiver;

an evaluator configured to evaluate, at said second transceiver, characteristics of said plurality of beams received at said second transceiver;

a determiner configured to determine at least one dominant beam using said characteristics; and a deriving device configured to derive control information for being fed back from said second transceiver to said first transceiver, based on said evaluated characteristics, wherein said control information for said at least one dominant beam is allocated a different quantization resolution as compared to a less dominant beams wherein said quantization resolution allocated to said at least one dominant beam is higher as compared to the one of a less dominant beam.

18. The apparatus recited in claim 17, wherein said plurality of beams constitutes a parameterized beam array, and said characteristics of said beams are represented by parameterization parameters.

19. The apparatus recited in claim 18, wherein said characteristics are based on an eigenvalue decomposition of the correlation matrix being based on the channel matrix of the channel impulse responses of the plurality of channels.

20. The apparatus recited in claim 19, wherein the beams that have the highest effect on the received signal power represent the dominant beams.

21. The apparatus recited in claim 19, wherein a parameterization parameter having the maximum value is determined as representing the dominant beam.

22. The apparatus recited in claim 17, wherein said characteristics are based on an eigenvalue or matrix decomposition of the long-term averaged correlation matrix or short-term correlation matrix being based on plural instantaneous channel matrices of the channel impulse responses of the plurality of channels.

23. The apparatus recited in claim 22, wherein an eigenbeam having a maximum eigenvalue is determined as representing the dominant beam.

24. The apparatus recited in claim 17, wherein said characteristics are based on an independent component analysis of said channel realizations, or channel matrix, or channel correlation matrix yielding a relative power indication per beam.

25. The apparatus recited in claim 17, wherein said characteristics are estimated adaptively from received signals.

26. The apparatus recited in claim 23, wherein the beam corresponding to the relative power indicator indicating the largest relative power, is determined as representing the dominant beam.

27. The apparatus recited in claim 17, wherein said control information for said beam determined as being dominant is allocated a predetermined quantization resolution.

28. The apparatus recited in claim 17, wherein said second transceiver determines the quantization resolution to be allocated to said beam determined as being dominant.

29. The apparatus recited in claim 17, wherein said control information for said beam or beams determined as being dominant is allocated a 8 phase-shifting keying quantization resolution constellation, and quadrature phase-shifting keying or binary phase-shifting keying quantization resolution constellation is allocated to the control information for the remaining less dominant beams.

30. The apparatus recited in claim 28, wherein said control information for said beam determined as being dominant is allocated a 8 phase-shifting keying or quadrature phase-shifting keying quantization resolution constellation, and quadrature phase-shifting keying or binary phase-shifting keying, or binary phase-shifting keying quantization resolution constellation is respectively allocated to the control information for the remaining less dominant beams.

31. An apparatus, comprising:

reception means for receiving a plurality of at least two beams from another transceiver via a plurality of transmission channels;

evaluation means for evaluating, characteristics of said plurality of beams;

determination means for determining at least one dominant beam using said characteristics; and derivation means for deriving control information for being fed back from said transceiver to said first transceiver, based on said evaluated characteristics, wherein said control information for said at least one dominant beam is allocated a different quantization resolution as compared to a less dominant beam, wherein said quantization resolution allocated to said at least one dominant beam is higher as compared to the one of a less dominant beam.

32. An apparatus, comprising:

reception means for receiving a plurality of beams from a first transceiver via a plurality of transmission channels at a second transceiver;

evaluation means for evaluating, at said second transceiver, characteristics of said plurality of beams received at said second transceiver;

determination means for determining at least one dominant beam using said characteristics; and derivation means for deriving control information for being fed back from said second transceiver to said first transceiver, based on said evaluated characteristics, wherein said control information for said at least one dominant beam is allocated a different quantization resolution as compared to a less dominant beam, wherein said quantization resolution allocated to said at least one dominant beam is higher as compared to the one of a less dominant beam.

* * * * *